Oct. 19, 1965 G. A. CHILDS ETAL 3,212,908
METHOD FOR GRANULATING POWDERY MATERIALS
Original Filed Sept. 7, 1960 2 Sheets-Sheet 1
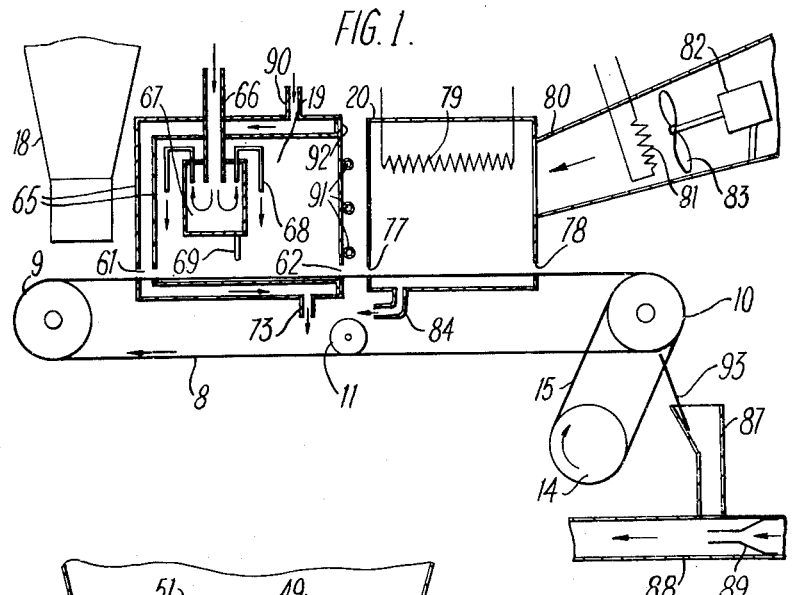
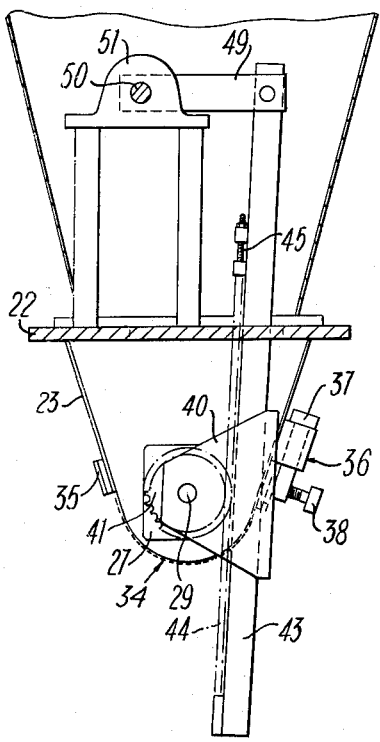
Inventors
GEORGE ALBERT CHILDS
ALEXANDER EDWARD METTLER
BY
Bacon & Thomas Attorneys

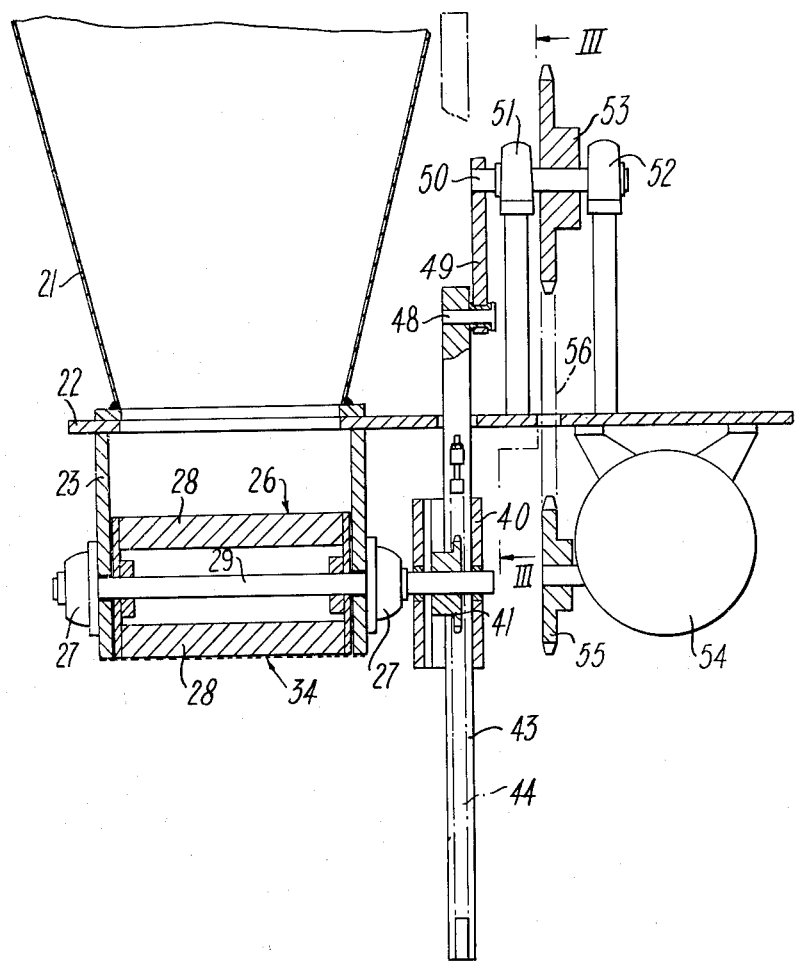

United States Patent Office 3,212,908
Patented Oct. 19, 1965

3,212,908
METHOD FOR GRANULATING POWDERY
MATERIALS
George Albert Childs, London, and Alexander Edward Mettler, Stanmore, England, assignors to Glaxo Group Limited
Continuation of application Ser. No. 54,483, Sept. 7, 1960. This application Dec. 9, 1964, Ser. No. 419,271
Claims priority, application Great Britain, Sept. 10, 1959, 30,964/59
5 Claims. (Cl. 99—199)

This is a continuation of U.S. application Serial No. 54,483 filed September 7, 1960, now abandoned.

This invention is concerned with improvements in or relating to a process for the granulation, particularly but not exclusively, of heat-sensitive powdery materials, and to apparatus for carrying out such a process.

The granulation of a number of materials, particularly heat-sensitive materials, may give rise to a number of difficulties. For example, it is commonly desired to granulate various powdery proteinaceous materials to render them more readily dispersible in water, and granulation techniques involving heat-drying operations may cause partial decomposition of these materials or at least the formation of a hard skin over the granules which impedes dispersion. Examples of powdery materials containing protein where such difficulties may arises, are dried milk powder, particularly dried full cream milk, dietary preparations such as invalid broth etc. Similar difficulties may also be experienced in the granulation of starch-containing powder, where again, undue heating may cause the formation of hard granules.

It is also commonly desired to granulate powdery materials to improve their free-flowing properties, and in this case, increasing the rate of dispersion in a given liquid by the granulation process may or may not be important. Thus when the rate of dispersion in a given liquid is unimportant, the granules produced by the granulation process may be hard, or have a hard skin.

Granulation processes are also commonly used in the manufacture of pharmaceutical products, for example in the production of tablets, the powdered product to be tabletted being frequently first granulated before being fed to a tablet-making machine.

An object of the present invention is to provide an improved method of granulating powdery materials which is convenient and simple to operate, which is particularly adapted for the granulation of heat-sensitive materials, especially protein-containing materials, and by which the range of powdery materials which can be satisfactorily granulated is increased.

Powdery materials which can be granulated in accordance with this invention are such wherein the particles of the powder possess some tendency to adhere one to the other when they are subjected to the action of steam, and such powdery materials are hereinafter called "powdery materials of the kind referred to." The tendency of the particles to adhere may be either by reason of the nature of the basic constituents of the powder or by virtue of the incorporation of a binding agent therein. Proteinaceous materials, and in particular powdered food preparations, often exhibit some tendency for the particles to adhere one to the other under the action of steam; however, for example in the granulation of say a powdered pharmaceutical preparation, no such tendency will be inherent, and the addition of some binding agent e.g. magnesium stearate, may be necessary as in conventional granulation procedures.

According to the invention, we provide a method of granulating or agglomerating powdery materials of the kind referred to wherein the material is first formed into individual masses of contiguous particles which are then subjected to steam treatment and thereafter dried to form coherent granules or agglomerates.

It will be appreciated that the coherent granules or agglomerates need not necessarily be of a size which it is ultimately desired to produce, and they may be subjected to further size reduction. Indeed, in a modification of the present invention, powdery material of the kind referred to is first formed into a layer of contiguous particles which are then subjected to steam treatment and thereafter dried to form a coherent agglomerate, the agglomerate then being subdivided into smaller sized agglomerates or granules.

By the term "granule" we means a mass of cohering particles. The granules may be hard or soft, but since some products of the process according to the invention consist of individual masses of particles which are soft and only loosely cohere together and which may not strictly be called granules, the term "agglomerate" has been used to cover interalia such products.

The essence of the present invention is, in effect, pre-shaping the granules or agglomerates before they are subjected to the steam treatment to make them cohere, as distinct from prior granulating processes for example in which powdery material is allowed to fall freely through a steam zone, individual particles adhering together only after they have been humidified by the steam.

Preferably, in carrying out the method according to the invention, abrasion of the individual masses of particles between the time when they are pre-shaped and when they have been dried, for example by allowing them to rub against one another or against the walls of a transportation duct, is prevented since such abrasion would result in a diminution in the granule size of the end product which may be undesirable.

If the steam with which the steam treatment is carried out contains large droplets of water, such droplets if they fell on the material being granulated would result in the production of wet masses of the material which would then be difficult to dry satisfactorily and might prevent the formation of a uniform end product. Preferably therefore, the steam with which the steam treatment is carried out is free from droplets larger than 0.1 mm. in diameter.

Any suitable method of drying the granule-like masses, for example by heating with a stream of warm air or with radiant heat, can be used provided the temperatures achieved do not deleteriously affect the material e.g. by denaturing proteinaceous material. A combination of hot air drying and radiant heat drying has been found very satisfactory.

After the granule-like masses have been dried, they may be cooled and collected into containers. Advantageously, these two steps are carried out by the one expedient of transporting the warm, dried granules in a quickly moving stream of cold air to a cyclone collector.

Also according to the present invention, there is provided apparatus for granulating powdery materials of the kind referred to comprising a movable conveyor, a device for forming individual masses of contiguous particles on the conveyor, and a steam chamber and a drying chamber for respectively steam treating and drying said masses as they are moved by the conveyor.

Preferably the conveyor is an endless plastic or plastic-coated belt, so that it can be easily maintained sufficiently clean to satisfy the standards of hygiene.

Any suitable and convenient device can be used for forming the individual masses of particles on the conveyor. For example, the device can comprise one or more movable blades adapted in operation to move over a mesh and force the material through the mesh onto the conveyor. In this case, the size of the individual masses of particles as they are formed on the conveyor will depend on the size of mesh used and will be substantially uniform. The material to be granulated can be fed to the mesh from a hopper which incorporates, if necessary, a vibrator to avoid cavitation arising in the material whilst it is being fed. Such a device can be used for example with powdery material which possesses an inherent tendency to cohere loosely when pressed together under light pressure, in which case the individual masses of particles formed on the conveyor will have some cohesion before they are steam treated. Alternatively, the device can be used for example with powdery material which does not possess such an inherent tendency, and in this case the individual masses formed on the conveyor will each consist of a loose pile of particles.

In the modification of the invention mentioned previously where a layer of contiguous particles is first formed before the steam treatment, and which is subsequently subdivided after the particles have been made to cohere, the device for forming such layer on the conveyor can comprise any mechanism known to be suitable for performing this operation.

The steam chamber may have a substantially enclosed construction, the conveyor entering through a slot at one end and leaving through another solt at the opposite end. In operation, steam enters the chamber through one or more steam lines, and in order to prevent condensation on the walls of the chamber and thereby to avoid the risk of condensed water droplets falling on the material on the conveyor, the chamber is preferably provided with a steam jacket. Preferably also, the steam line or lines terminate in the steam chamber in moisture traps for the same reason.

The drying chamber may also have a substantially enclosed construction, the conveyor entering and leaving through slots at opposite ends. Any convenient means for supplying heat for drying the material on the conveyor can be used e.g. a hot-air blower for feeding hot air into the drying chamber, or an electric radiant heater. Preferably however the drying chamber incorporates both these means since the drying chamber can then be made shorter than if only one of them was to be used.

It is preferred to provide at the end of the conveyor a hopper which feeds into a pneumatic collection system, the hopper serving to receive and guide warm, dried granules from the conveyor into a stream of cold air which cools and conveys them into a cyclone collector of the collecting system.

There will now be described by way of example only one method of and apparatus for granulating the dietary preparation which is described in U.S. Patent No. 2,961,320 reference being made to the accompanying drawings in which:

FIG. 1 is a diagrammatic side elevation of the granulating apparatus,

FIG. 2 is a cross-sectional view showing details of a feed hopper, and

FIG. 3 is a side view taken on the line III—III of FIG. 2, a rack being shown in a different position from that shown in FIG. 2.

With reference to FIG. 1, an endless, plastic-covered conveyor belt 8 is supported on two rollers 9, 10 and is tensioned by an adjustable jockey roller 11. Drive is transmitted to the belt 8 from a driven pulley 14 by way of a pulley belt 15.

Above the infeed end of the belt 8, there is a feed hopper 18, and further along the belt 8 there is a steam chamber 19, and a drying chamber 20.

The feed hopper 18 is shown in detail in FIGS. 2 and 3, and comprises a conical container 21 mounted on a plate 22 below which there is secured a U-shaped trough 23 (see FIG. 3). The container 21 communicates through a hole in plate 22 with the trough 23. A rotor 26 is mounted on bearings 27 on the trough 23, there being six hexagonal bars 28 secured to and equally spaced round the shaft 29 of the rotor 26, only two of the bars 28 being shown.

The bottom of the trough 23 is open and is covered by a No. 10 mesh (B.S.) screen 34 which extends from a holding member 35 to a device 36 provided with setscrews 37, 38 for respectively tensioning and clamping the mesh in position.

The shaft 29 extends into a cage 40, and a sprocket 41 which is disposed between the side walls of the cage 40 is secured to the shaft 29. A rack 43 carrying a chain 44 which is maintained under tension by a bolt 45 is also disposed in the cage 40 so that the rear face of the rack 43 abuts the rear wall of the cage and the sprocket 41 engages the chain 44.

A stub shaft 48 projecting from one end of the rack 43 is rotatably mounted in a crank 49, the other end of the crank being fixedly mounted on a shaft 50 which is mounted in bearings 51, 52. Drive is transmitted to a sprocket 53 mounted on shaft 50 from an electric motor 54 by way of a sprocket 55 and a chain 56.

Reverting to FIG. 1, the steam chamber 19 surrounds the belt 8 as it passes therethrough, the belt 8 entering at a slot 61 in one wall and leaving at a slot 62 in the opposite wall. The steam chamber is provided with an outer jacket 65 and a detachable inspection plate 92, heated by steam pipes 91. As shown diagrammatically, steam enters this external jacket through pipe 90. The pipe 66 terminates within a vessel 67 which serves as a trap for large water droplets entrained in the steam supply. A plurality of tubes 68 (only two of which are shown) extend from the top of the vessel 67 and their ends are directed down towards the belt 8. A water outlet tube 69 is provided for the vessel 67 which projects through one side wall of the steam chamber 19, and a steam outlet pipe 73 serves also as an outlet for steam in the jacket of the steam chamber 19. Any excess steam present in the steam chamber 19 during the process is allowed to escape through the slots 61 and 62 in the end walls of the steam chamber 19.

The drying chamber 20 also surrounds the belt 8 as it passes therethrough, the belt entering at a slot 77 and leaving at a slot 78. An electric radiant heater as indicated at 79 is mounted near the top of the chamber 20, and a tunnel 80 is connected to one end of the chamber 20. The tunnel 80 contains a further electric heater as indicated at 81 and an electric motor 82 which drives a fan 83.

Both the steam chamber 19 and the drying chamber 20 are provided with heat insulating lagging (not shown).

A spring-tensioned scraper 93 directs material into a hopper 87 which is disposed beneath the delivery end of the belt 8, and feeds into a pipe 88 of a pneumatic collecting system, the pipe 88 containing a constriction 89 which terminates beneath the end of the hopper in such a position as to enable the quickly moving air stream in the pipe 88 to entrain the granulated material from the belt 8 and to prevent this air stream from blowing the material back up the hopper 87.

In operation, as the motor 54 of the feed hopper 18 drives the sprocket 55 the crank 49 rotates on shaft 50 to cause the rack 43 simultaneously to reciprocate and oscillate in the cage 40. The chain 44 then rotates the sprocket 41 so that the rotor 26 rotates alternately in opposite directions. The movement of the hexagonal bars 28 over the screen 34 forces the material to be granulated which is fed into the container 21 of the feed hopper, through the screen 34 to form loosely adhering, granule-like masses in a layer on the belt 8.

The belt 8 is driven continuously from the driven pulley 14 so that the layer of granule-like masses is first transported through the steam chamber 19, and then through the drying chamber 20. In the steam chamber 19, the tubes 68 direct steam from the vessel 67 on to the layer of granule-like masses on the belt, the number and disposition of the tubes 68 being chosen to humidify the layer uniformly. As already indicated, large water droplets of a diameter greater than 0.1 mm. are prevented from falling on the belt by the use of the vessel 67 and the jacket 65. The humidification of the material being granulated (i.e. the material as described in the examples of U.S. Patent No. 2,961,320) leads to the formation of an aqueous film on the surface of the particles making up the loosely adhering granule-like masses. Water-soluble constituents of the material dissolve in this film and since these constituents include sugar and dextrin, the film becomes sticky and increases the adhesion with which the particles making up the granule-like masses cohere.

The layer of moist, granule-like masses on the belt 8 is then conveyed into the drying chamber 20 where it is subjected to the drying action of radiant heat from the heater 79 and a stream of warm air produced by the motor 82 driving the fan 83 which causes air to flow through the tunnel 80 past the heater 81. Most of the warm air stream leaves the drying chamber 20 by the slot 77. The effect of this drying action is to set the soft, moist, granule-like masses into relatively hard, coherent granules, in general possessing a porous structure, and being relatively stable physically.

When the material leaves the drying chamber 20, it is warm, and before it is stored, it must be cooled to prevent deterioration. At the end of the belt 8, the material falls into the hopper 87, any material adhering to the belt 8 being removed by the spring-tensioned scraper 93, the material then being conveyed to a cyclone collector and simultaneously cooled by a quickly moving stream of cold air in the pipe 88. Ambient air is normally satisfactory for this air stream, but in humid climates, it may be necessary to dry the air initially so that the moisture content of the cooled, granulated material remains at a satisfactorily low level.

The use of a pneumatic collecting system diminishes the granule size of the end product to a certain extent so that this size is not solely dependent on the size of the mesh 34 of the feed hopper 18.

The time during which the material being granulated remains in the steam chamber and the drying chamber can be varied by changing the belt speed and/or the longitudinal dimensions of these chambers. Good results were obtained with the apparatus described when the material remained in the steam chamber for approximately 4 to 11 seconds and in the drying chamber for approximately 5 to 16 seconds, the average temperature in the drying chamber being approximately 175° C.–190° C. and the temperature of the heated air flow to the drying chamber being from 100° C. to 110° C.

Instead of using a No. 10 (B.S.) mesh screen 34, other mesh screen sizes can be used, preferably within the range of Numbers 8–16. The best results as regards the consistency of the finished product were obtained with mesh screen sizes within the range of Numbers 10 to 16, and within this range, a No. 10 mesh is preferred since the other mesh screen sizes resulted in a reduced output from the apparatus.

Granulation by means of the apparatus described changed the somewhat greasy starting material to a free flowing granular powder which could be much more easily dispersed in water. The production of a free flowing granular powder greatly facilitates handling during packaging, and increases the accuracy with which it can be weighed out by a packaging machine.

It will be appreciated that many modifications and variations may be made in the embodiment that has been described without departing from the scope of the invention. Thus for example, the steam chamber may be provided with several steam lines and moisture traps, the tubes 68 leading therefrom being arranged above the belt in a series of rows. Furthermore, instead of useing hexagonal bars 28, nylon brushes can be used which are mounted in the rotor 26 so that the bristles of the brushes extend radially outwardly of the rotor 26. The advantage of using such brushes is that they are durable and self-cleaning.

In the modification of the invention mentioned previously in which a layer of powdery material is formed on the conveyor before it is steam treated, the feed hopper 18 shown in FIG. 1 would be replaced by a suitable device for forming a thin layer on the conveyor 8. After this layer has been steam treated and dried, it tends to break up into small pieces due to the curvature of the conveyor as it passes over the roller 10. The spring-tensioned scraper may also reduce the size of the pieces as they are removed from the conveyor 8, and if it is desired to carry out a further size reduction step, this may conveniently be achieved by mounting a worm feed at or in the bottom of the hopper 87 for forcibly feeding the material into the duct 88.

It has been found that a wide range of materials can be granulated by the method and apparatus of the invention. Such materials include powdered food preparations, e.g. proteinaceous materials, carbohydratae containing materials such as milk powders, soup powders and other powdered dehydrated food preparations. In particular it is possible to granuate dried full cream milk in accordance with the invention which has proved difficult with apparatus hitherto proposed in which the material falls freely through a steam zone. This appears to be due essentially to the fact that the individual masses of particles are first pre-formed and thereafter supported whilst they are being subjected to steam tretament and drying, whereas the free-fall method of granulation relies on the chance contacting and holding together of humidified particles falling under gravity. It will be seen that the possibility of contacting particles holding together will be reduced if the particles are travelling at different velocities due to their having different weight and size, especially if the particles have only low adhesion for one another in their humidified state. Indeed the falling particles may abrade one another and become reduced in size rather than hold together.

The process according to the invention is particularly useful for the granulation of powdered dietary preparations, a particular example of which is the preparation described in U.S. Patent No. 2,961,320.

We claim:
1. A method of forming granules of substantially uniform size from heat sensitive, powdery, edible material rendered adhesive by the action of steam, which comprises: forming on a supporting surface said powdery material while dry into individual masses of contiguous particles, said masses being of substantially uniform size; steaming the dry masses to form an aqueous adhesive film on the surfaces of the contiguous particles to cause them to cohere; and drying said masses to form coherent granules, the positioning of said individual masses relative to said supporting surface being fixed from the time of their formation until they are dried whereby abrasion of the individual masses of particles of said powdery material is prevented.

2. The method defined in claim 1 wherein the steaming is effected with steam which is free from water droplets larger than 0.1 mm. in diameter.

3. The method defined in claim 1 wherein said coherent granules are cooled after drying by transporting them in a rapidly moving stream of cold air.

4. The method defined in claim 1 wherein said powdery material is selected from the group consisting of a powdered protein-containing material and a powdered carbohydrate-containing material.

5. A method of forming granules of substantially uniform size from heat-sensitive, powdery, edible material rendered adhesive by the action of steam, which comprises: continuously forming on a moving supporting surface said powdery material while dry into individual masses of contiguous particles, said masses being of substantially uniform size; moving said individual masses on said supporting surface through a first zone; steaming said masses while in said first zone to form an aqueous adhesive film on the surface of the contiguous particles to cause them to cohere; moving said steamed masses on said supporting surface through a second zone; and drying said steamed masses while in said second zone to form coherent granules, the positioning of said individual masses relative to said supporting surface being fixed from the time of their formation until they are dried whereby abrasion of the individual masses of said powdery material is prevented.

References Cited by the Examiner

UNITED STATES PATENTS

| | | | |
|---|---|---|---|
| 33,524 | 10/61 | Finken | 127—63 |
| 338,924 | 3/86 | Carson et al. | 23—313 |
| 1,656,572 | 1/28 | Schultze | 23—313 |
| 2,977,203 | 3/61 | Sienkiewicz | 23—313 |
| 2,995,773 | 8/61 | Gidlow et al. | 18—1 |

A. LOUIS MONACELL, *Primary Examiner.*